United States Patent [19]
Nakae et al.

[11] Patent Number: 5,125,380
[45] Date of Patent: Jun. 30, 1992

[54] TWO-STROKE DIESEL ENGINE

[75] Inventors: Koichi Nakae; Tadashi Fukuyama; Toyokazu Baika; Takeshi Sato, all of Shizuoka; Michio Kawagoe, deceased, late of Shizuoka, all of Japan, by Meiko Kawagoe, legal representative

[73] Assignee: Toyota Jidosha Kabushiki Kaisha, Toyota, Japan

[21] Appl. No.: 731,252

[22] Filed: Jul. 17, 1991

[30] Foreign Application Priority Data

Sep. 6, 1990 [JP] Japan ................................ 2-234563
Sep. 17, 1990 [JP] Japan ................................ 2-243891

[51] Int. Cl.⁵ ........................ F02B 19/14; F02B 75/02
[52] U.S. Cl. .................................... 123/257; 123/302
[58] Field of Search ................ 123/257, 302, 65 VD

[56] References Cited

U.S. PATENT DOCUMENTS

| | | | |
|---|---|---|---|
| 3,125,077 | 3/1964 | Monnot et al. | 123/257 |
| 4,162,662 | 7/1979 | Melchior | 123/65 VD |
| 4,616,605 | 10/1986 | Kline | 123/65 VD |
| 4,840,147 | 1/1989 | Tanahashi et al. | 123/65 VD |

FOREIGN PATENT DOCUMENTS

| | | |
|---|---|---|
| 0062143 | 10/1982 | European Pat. Off. |
| 0299385 | 1/1989 | European Pat. Off. |
| 58-91325 | 5/1983 | Japan |
| 58-91326 | 5/1983 | Japan |
| 58-91327 | 5/1983 | Japan |
| 2-30963 | 2/1990 | Japan |

Primary Examiner—Andrew M. Dolinar
Attorney, Agent, or Firm—Oliff & Berridge

[57] ABSTRACT

A two-stroke diesel engine comprising a pair of intake valves arranged on one side of the inner wall of the cylinder head, and a pair of exhaust valves arranged on the other side of the inner wall of the cylinder head. The valve openings of the intake valves, which are located on the exhaust valve side, are covered by corresponding masking walls. A prechamber is formed in the cylinder head, and the opening of the prechamber is arranged in the peripheral inner wall portion of the cylinder head, which is positioned farthest from the exhaust valves, between the intake valves.

8 Claims, 7 Drawing Sheets

TWO-STROKE DIESEL ENGINE

BACKGROUND OF THE INVENTION

1. Field of the Invention

The present invention relates to a two-stroke diesel engine.

2. Description of the Related Art

To obtain a good loop scavenging operation in the combustion chamber of a known two-stroke diesel engine, a masking wall is provided for masking the valve opening between the valve seat and the peripheral portion of the intake valve, which is located on the cylinder axis side, and, at the same time, masking the valve opening between the valve seat and the peripheral portion of the exhaust valve, which is located on the cylinder axis side, when the valve lifts of the intake valve and the exhaust valve are small. A fuel injector is arranged on the central portion of the inner wall of the cylinder head to inject fuel directly toward the combustion chamber (U.S. Pat. No. 4,162,662). In this two-stroke diesel engine, air flowing into the combustion chamber from the intake port flows toward the top face of the piston along the inner wall of the cylinder. Subsequently, the flow direction of the air on the top face of the piston is changed, and the air then made to flow toward the exhaust port along the inner wall of the cylinder, to thereby carry out a loop scavenging operation.

As another type of two-stroke diesel engine, a two-stroke diesel engine having a prechamber is known. In this engine, to obtain a good combustion in the prechamber, it is necessary to sufficiently scavenge the interior of the prechamber. In this case, if the loop scavenging operation is carried out, a good scavenging of the main chamber can be obtained. Nevertheless, whether or not a good scavenging operation can be obtained for the prechamber depends on the location of the prechamber, and therefore, if the location of the prechamber is not appropriate, it is difficult to obtain a good scavenging operation of same.

SUMMARY OF THE INVENTION

An object of the present invention is to provide a two-stroke diesel engine capable of obtaining a good scavenging operation of the prechamber.

According to the present invention, there is provided a two-stroke diesel engine comprising: a cylinder head having an inner wall; a pair of intake valves arranged on one side of the inner wall of the cylinder head; exhaust valve means arranged on another side of the inner wall of the cylinder head; a pair of masking walls each formed on the inner wall of the cylinder head to mask valve openings of the intake valves, which are located on the exhaust valve means side; a prechamber formed in the cylinder head and having an opening formed in a peripheral portion of the inner wall of the cylinder head, which portion is farthest from the exhaust valve means; between the intake valves; and a fuel injector arranged in the prechamber.

The present invention may be more fully understood from the description of a preferred embodiment of the invention set forth below, together with the accompanying drawings.

DESCRIPTION OF A PREFERRED EMBODIMENT

Figure 1:
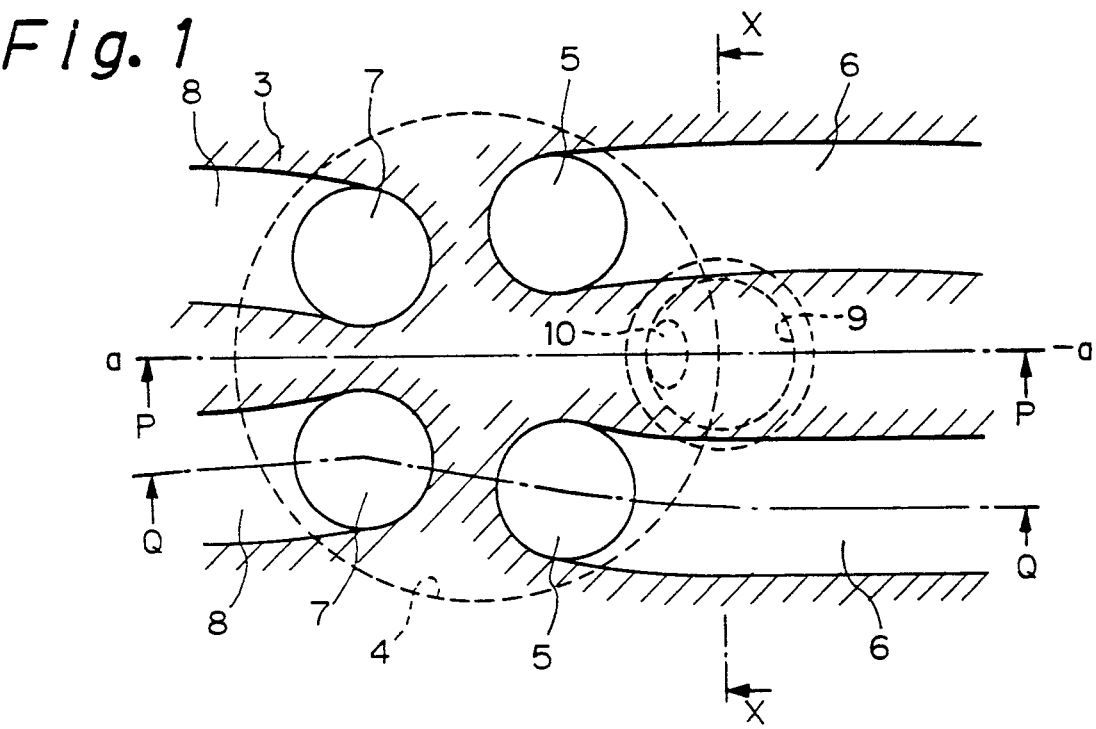
FIG. 1 is a cross-sectional plan view of a two-stroke diesel engine.
Figure 2:
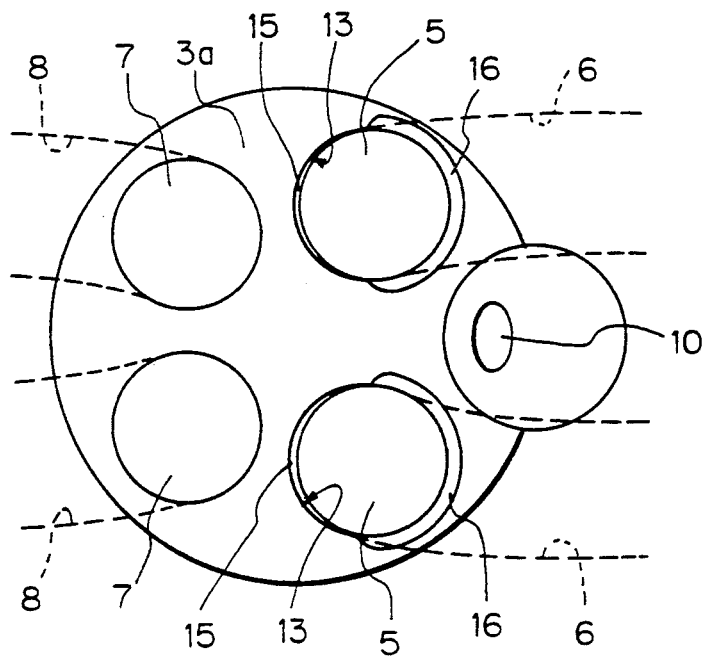
FIG. 2 is a view illustrating an inner of the cylinder head.

Referring to FIGS. 1 through 5, reference numeral 1 designates a cylinder block, 2 a piston reciprocally movable in a cylinder block 1, 3 a cylinder head fixed onto the cylinder block 1, and 4 a main chamber formed between the flat inner wall 3a of the cylinder head 3 and the flat top face of the piston 2; 5 designates a pair of intake valves, 6 intake ports, 7 a pair of exhaust valves, and 8 exhaust ports; 9 designates a prechamber, 10 an opening of the prechamber 9, which is positioned on the same plane as the inner wall 3a of the cylinder head 3, 11 a fuel injector for injecting fuel into the main chamber 4, and 12 a glow plug arranged in the prechamber 9. As illustrated in FIGS. 1 and 2, a pair of the intake valves 5 are arranged on one side of the inner wall 3a of the cylinder head 3, symmetrically with respect to the symmetrical plane a—a including the axis of the cylinder; and a pair of the exhaust valves 7 are arranged on the other side of the inner wall 3a of the cylinder head 3, symmetrically with respect to the symmetrical plane a—a. Further, as can be seen from FIGS. 1 and 2, the distance between the intake valves 5 is larger than the distance between the exhaust valves 7. In the embodiment illustrated in FIGS. 1 and 2, the distance between the intake valves 5 is considerably larger than the transverse width of the opening 10, and is approximately equal to the diameter of the prechamber 9. Conversely, the distance between the exhaust valves 7 is smaller than the transverse width of the opening 10. The opening 10 is arranged in the peripheral portion of the inner wall 3a of the cylinder head 3, which portion is farthest from the exhaust valves 7, between the intake valves 5. Further, the opening 10 is arranged on the symmetrical plane a—a, and directed toward the central portion of the main chamber 4 along the symmetrical plane a—a.

A pair of depressions 13 are formed in the inner wall 3a of the cylinder head 3, and valve seats 14 for the intake valves 5 are arranged in the deepest parts of the interiors of the corresponding depressions 13. Accordingly, when the intake valves 5 are seated on the valve seats 14, the intake valves 5 are retracted in the depressions 13. The peripheral wall portions of the depressions 13, which are located on the exhaust valve side, are arranged as close as possible to the peripheral portions of the corresponding intake valves 6 and have a semi-cylindrical shape, and thus these semi-cylindrical peripheral wall portions of the depressions 13 form masking walls 15 which cover the valve openings of the corresponding intake valves 5, which are located on the exhaust valve side. Conversely, the peripheral wall portions 16 of the depressions 13, which are positioned opposite to the corresponding masking walls 13, have a conical shape which diverges toward the main chamber 4.

Figure 3:
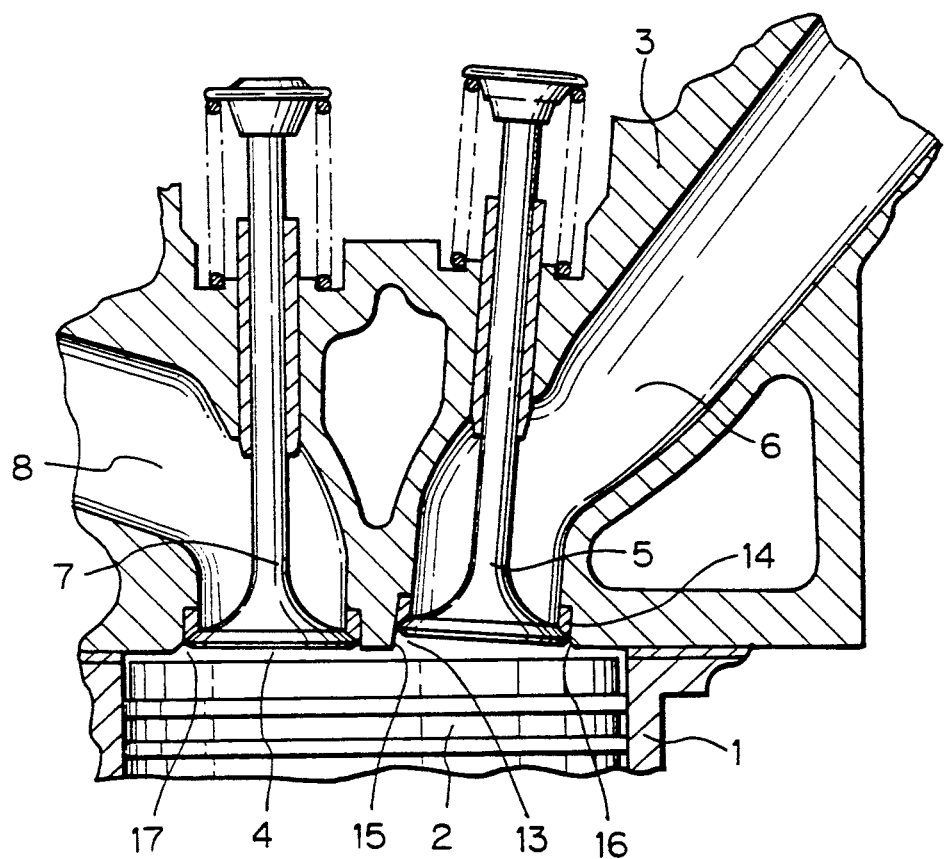
FIG. 3 is a cross-sectional side view of the engine, taken along the line Q—Q in FIG. 1.
Figure 4:
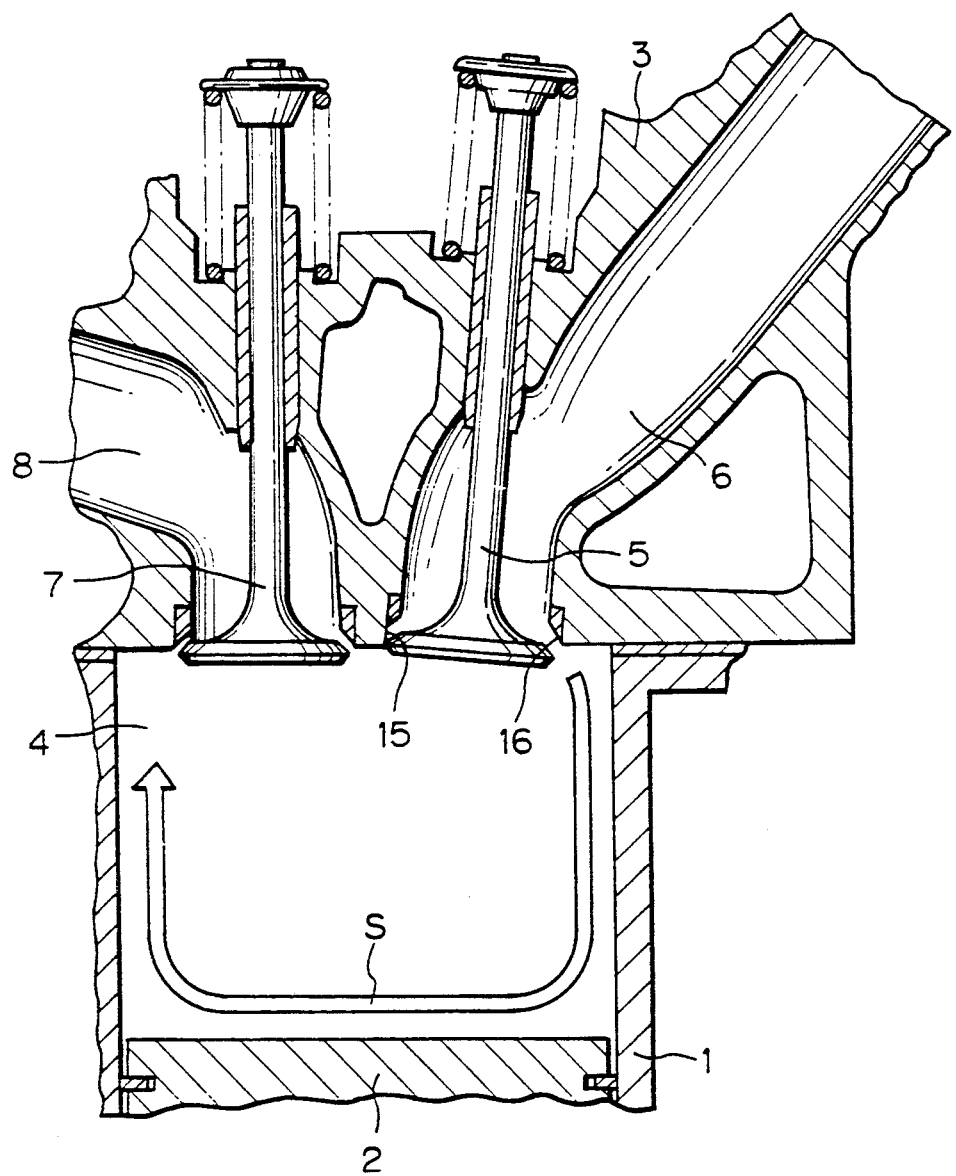
FIG. 4 is an enlarged cross-sectional side view of the engine, taken along the line Q—Q in FIG. 1.
Figure 9:
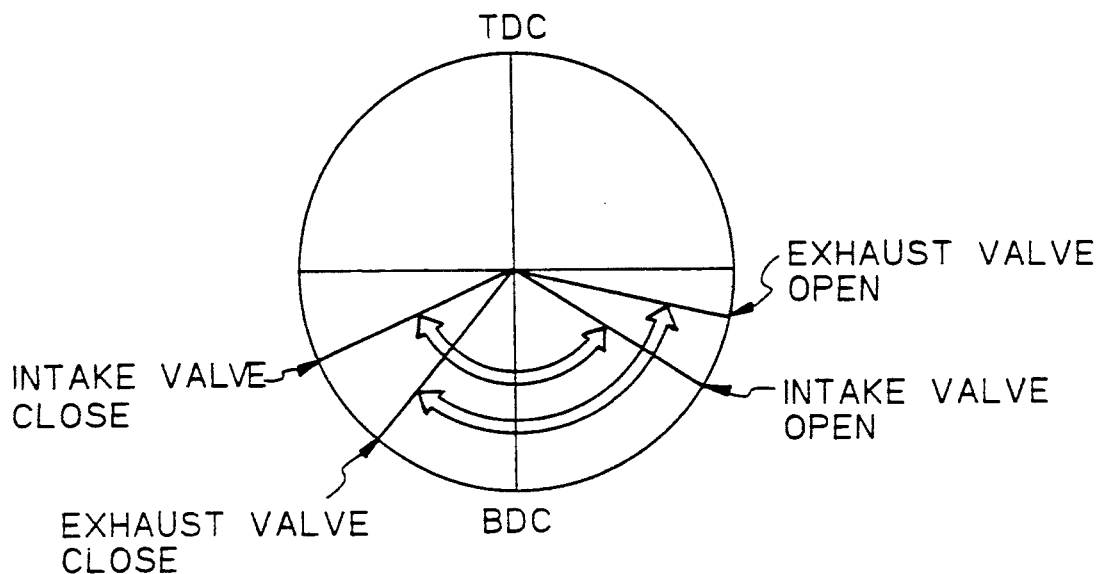
FIG. 9 is a diagram illustrating the opening time of an intake valve and an exhaust valve.

In the embodiment illustrated in FIGS. 1 through 3, as illustrated in FIG. 9, the exhaust valves 7 open earlier than the intake valves 5, and the exhaust valves 7 close earlier than the intake valves 5.

When the exhaust valves 7 are open, burned gas in the main chamber 4 is abruptly discharged into the exhaust ports 8. Thereafter, when the intake valves 5 are open, fresh air flows into the main chamber 4 via the intake valves 5. At this time, since the valve openings of the intake valves 5, which openings are located on the exhaust valve side, are masked by the masking walls 15, the fresh air flows into the main chamber 4 from the valve opening of the intake valves 5, which openings are located on the opposite side of the masking walls 15, along the semi-spherical peripheral wall portions 16. Then, as illustrated by the arrows S in FIGS. 4 and 5, the fresh air flows downward along the inner wall of the cylinder, located beneath the intake valves 5 and then moves forward along the top face of the piston 2 and flows upward along the inner wall of the cylinder, located beneath the exhaust valves 7. Thus, the fresh air flows within the main chamber 4 in the form of a loop. The burned gas in the main chamber 4 is discharged via the exhaust valves 7 by the air stream S flowing in the form of a loop manner.

Figure 6:
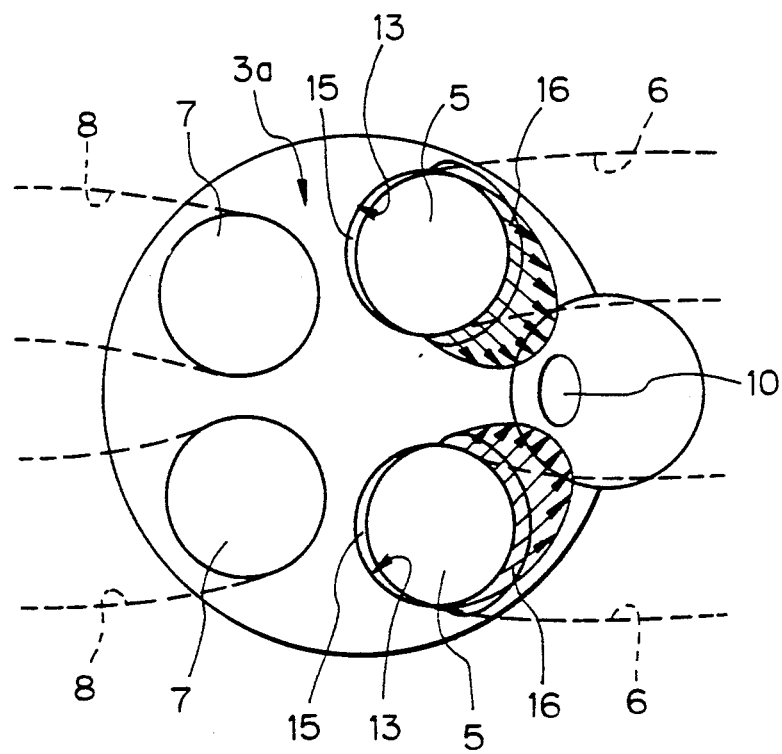
FIG. 6 is a view illustrating the inner wall of the cylinder head.

As can be seen from FIG. 2, the intake valves 5 are arranged on the peripheral portion of the inner wall 3a of the cylinder head 3 on each side of the opening 10 and therefore, if considering only the peripheral portions of the intake valves 5, which are located within the ranges of the semi-cylindrical peripheral wall portions 16, the peripheral portions of the intake valves 5, which are remote from the opening 10, are positioned closer to the peripheral end portion of the inner wall 3a of the cylinder head 3, compared with the peripheral portions of the intake valves 5, which are near the opening 10. As a result, fresh air flows easily into the main chamber 4 from the valve openings of the intake valves 5, which are located near the opening 10, and thus the fresh air flowing into the main chamber 4 from the intake ports 6 has a velocity distribution as illustrated by the arrows in FIG. 6. Namely, the velocity component of the fresh air toward the opening 10 becomes maximum, and after the air streams having the maximum velocity component and flowing toward the opening 10 merge beneath the opening 10, the combined air streams move downward along the inner wall of the cylinder.

Figure 5:
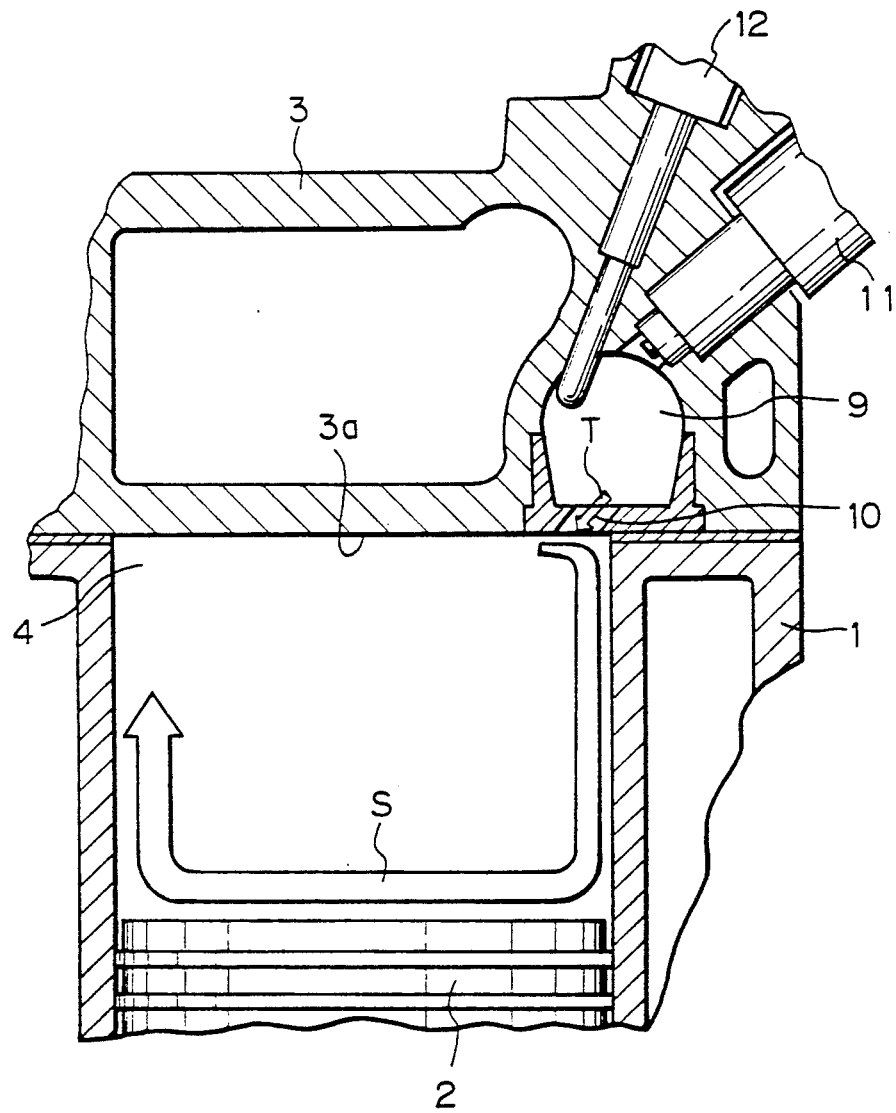
FIG. 5 is a cross-sectional side view of the engine, taken along the line P—P in FIG. 1.

As mentioned above, since the air streams having the maximum velocity component are merged beneath the opening 10 and then flow downward, burned gas in the prechamber 9 is effectively sucked out by these air streams, as illustrated by the arrow T in FIG. 5. Further, since the air streams flow downward along the inner wall of the cylinder after being merged, almost only fresh air exists in the main chamber 4 beneath the opening 10, and accordingly, when the compression stroke is started, fresh air is forced into the prechamber 9 via the opening 10.

Then, fuel is injected from the fuel injector 11 toward the prechamber 9 at the end of the compression stroke, and this injected fuel is ignited and burned in the prechamber 9. As mentioned above, since fresh air is forced into the prechamber 9 after burned gas in the prechamber 9 is sucked out, a large amount of air has been fed into the prechamber 9, and thus the fuel injected into the prechamber 9 is easily ignited and properly burned in the prechamber 9.

Figure 7:
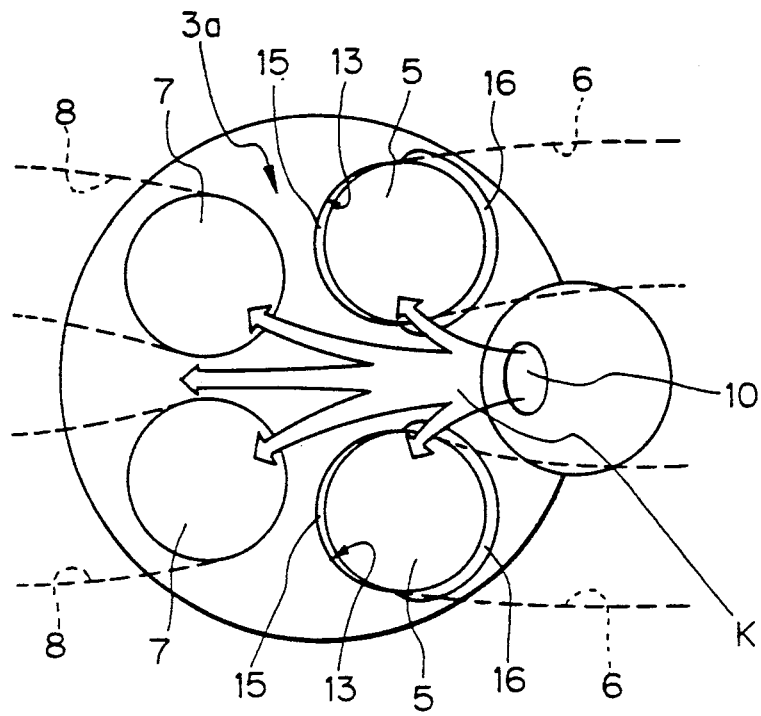
FIG. 7 is a view illustrating the inner wall of the cylinder head.
Figure 8:
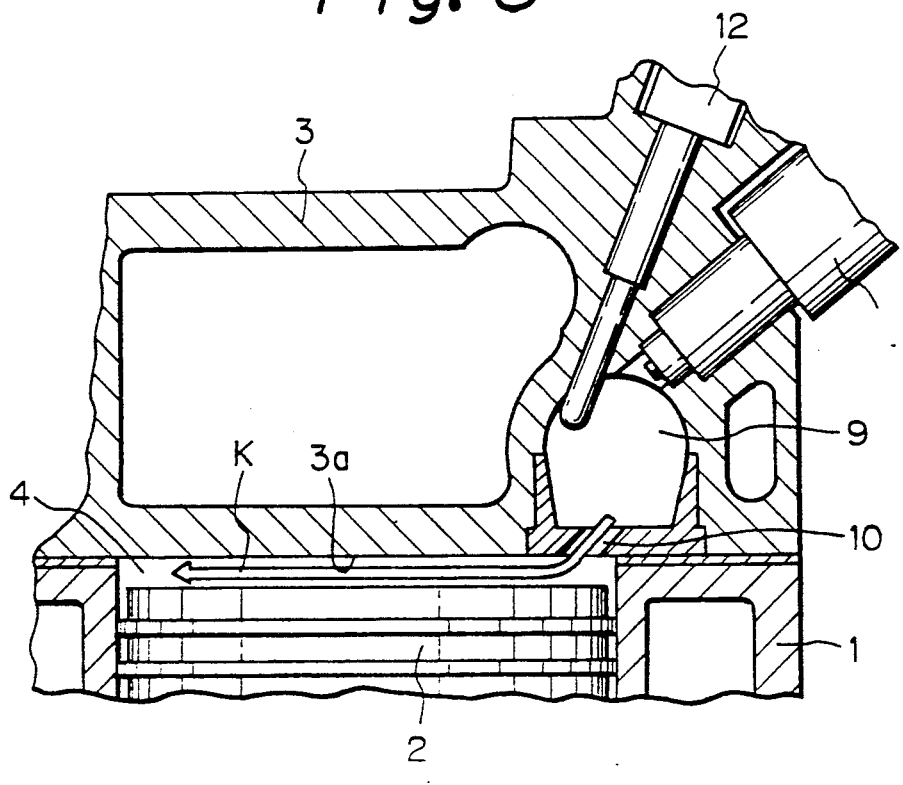
FIG. 8 is an enlarged cross-sectional side view of the engine, taken along the line P—P in FIG. 1.

When the pressure in the prechamber 9 increases, unburned air-fuel mixture existing in the prechamber 9 near the opening 10 is pushed out from the opening 10 into the main chamber 4, and then, as illustrated by K in FIGS. 7 and 8, burning gas is spouted from the opening 10. The unburned air-fuel mixture and the burning gas pass between the top face of the piston 2 and the inner wall 3a of the cylinder head 3 and move forward between the exhaust valves 7 along the symmetrical plane a—a. Since the unburned air-fuel mixture and the burning gas move forward while slightly spreading in the lateral direction, after being spouted from the opening 10, a part of the unburned air-fuel mixture and a part of the burning gas flow into the depressions 13 beneath the exhaust valves 7 as illustrated in FIG. 7, and then the unburned air-fuel mixture, which has been mixed with air in the depression 13, is ignited and burned by the burning gas. As can be seen from FIG. 7, since the distance between the intake valves 5 is large, a large part of the unburned air-fuel mixture and a large part of the burning gas move forward to the exhaust valves 7 without being blocked by the masking walls 15. As illustrated in FIG. 3, when the exhaust valves 7 are closed, the exhaust valves 7 are slightly retracted from the inner wall 3a of the cylinder head 3, and accordingly, spaces 17 are created beneath the exhaust valves 7. Further, as illustrated in FIGS. 2 and 7, the distance between the exhaust valves 7 is small and accordingly, the unburned air-fuel mixture and the burning gas, moving forward the exhaust valves 7, flow into the spaces 17 beneath the exhaust valves 7, and the unburned air-fuel mixture which has been mixed with air in the spaces 17 is ignited and burned by the burning gas. Consequently, since both the air in the depressions 13 beneath the intake valves 5 and the air in the spaces 17 beneath the exhaust valves 7 are used for the combustion, it is possible to obtain a high engine output.

Figure 10:
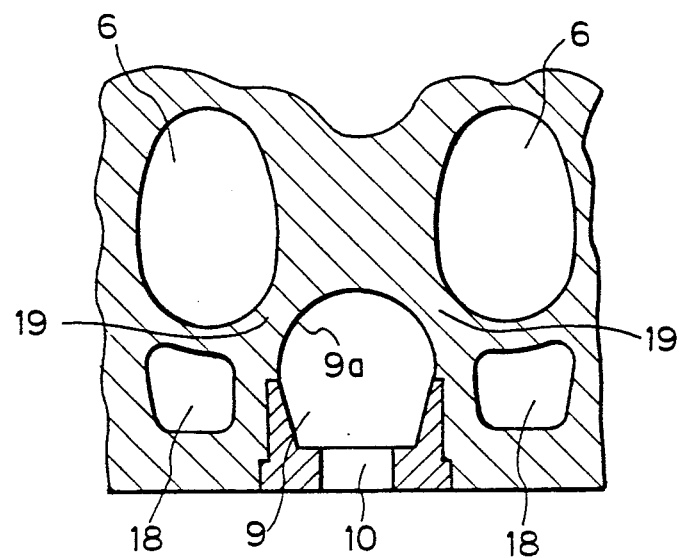
FIG. 10 is a cross-sectional view of the cylinder head, taken along the line X—X in FIG. 1.

Furthermore, as illustrated in FIG. 10, a pair of the intake ports 6 extend in the vicinity of the prechamber 9, and cooling water passages 18 are formed beneath the intake ports 6, respectively. Nevertheless, no cooling water passage is formed between the prechamber 9 and each of the intake ports 6; instead thin-walled solid cylinder head portions 19 exist between the upper wall portion 9a of the prechamber 9 and the intake ports 6. Consequently, since the inner walls of the intake ports 6 are strongly heated by the heat generated in the prechamber 9, fresh air flowing within the intake ports 6 is heated, and therefore, particularly when the engine is started when the temperature of the engine is low, it is possible to increase the vaporization of the injected fuel.

As mentioned above, according to the present invention, since fresh air is forced into the prechamber after burned gas in the prechamber is sucked out, it is possible to obtain a good ignition and burning in the prechamber.

While the invention has been described by reference to a specific embodiment chosen for purposes of illustration, it should be apparent that numerous modifications could be made thereto by those skilled in the art without departing from the basic concept and scope of the invention.

We claim:

1. A two-stroke diesel engine comprising:
   a cylinder head having an inner wall;
   a pair of intake valves arranged on one side of the inner wall of said cylinder head;
   exhaust valve means arranged on another side of the inner wall of said cylinder head;
   a pair of masking walls each formed on the inner wall of said cylinder head to mask valve openings of said intake valves, which are located on said exhaust valve means side;
   a prechamber formed in said cylinder head and having an opening forward in a peripheral portion of the inner wall of said cylinder head, which portion is farthest from said exhaust valve means, between said intake valves; and
   a fuel injector arranged in said prechamber.

2. A two-stroke diesel engine according to claim 1, wherein the distance between an unmasked peripheral portion of each intake valve and a peripheral and portion of the inner wall of said cylinder head becomes large toward said opening.

3. A two-stroke diesel engine according to claim 1, wherein said exhaust valve means comprises a pair of exhaust valves arranged symmetrically with respect to a symmetrical plane including an axis of a cylinder of the engine, and said intake valves are arranged symmetrically with respect to said symmetrical plane, said opening being arranged on said symmetrical plane and directed toward a central portion of a main chamber along said symmetrical plane, the distance between said intake valves being larger than the distance between said exhaust valves.

4. A two-stroke diesel engine according to claim 3, wherein said opening has a transverse width which is smaller than the distance between said intake valves.

5. A two-stroke diesel engine according to claim 4, wherein the transverse width of said opening is larger than the distance between said exhaust valves.

6. A two-stroke diesel engine according to claim 1, wherein a pair of depressions are formed on the inner wall of said cylinder head, and said intake valves are arranged in said corresponding depressions, each of said depressions having a semi-cylindrical peripheral wall portion which forms said masking wall.

7. Two-stroke diesel engine according to claim 6, wherein each of said depressions has a conical peripheral wall portion located opposite to said masking wall and diverging toward a main chamber.

8. A two-stroke diesel engine according to claim 1, wherein said cylinder head has intake ports therein and thin walled solid portions are arranged between said prechamber and each intake port.

* * * * *